United States Patent
Carpentier et al.

[15] 3,649,906
[45] Mar. 14, 1972

[54] PROGRAMMABLE DC POWER SUPPLY

[72] Inventors: Richard A. Carpentier; Spencer A. Shriver; Richard C. Smith, all of Charlottesville, Va.

[73] Assignee: Sperry Rand Corporation

[22] Filed: Sept. 8, 1970

[21] Appl. No.: 70,259

[52] U.S. Cl. .......................... 323/22 T, 321/18, 321/45 R, 323/25, 323/38
[51] Int. Cl. .......................................................... G05f 1/56
[58] Field of Search .................. 323/4, 9, 22 T, 22 SC, 22 R, 323/24, 25, 38; 321/18, 24, 45 R; 307/207, 247

[56] References Cited

UNITED STATES PATENTS

| | | | |
|---|---|---|---|
| 3,506,905 | 4/1970 | Thomas | 321/18 |
| 3,491,283 | 1/1970 | Johnston | 323/22 SC |
| 3,344,336 | 9/1967 | Moyer et al. | 321/45 DR X |

Primary Examiner—Gerald Goldberg
Attorney—S. C. Yeaton

[57] ABSTRACT

A programmable DC power supply including a proportionally controlled transistor connected in series with the load for varying the load current in accordance with the magnitude of a control signal applied to the transistor. A detector coupled across the transistor functions to sense high and low voltage thresholds and thereupon select an incrementally higher or lower voltage for application to the load to assure that the transistor operates continuously in its proportional range, thereby enabling the input signal to maintain control of the load current.

12 Claims, 3 Drawing Figures

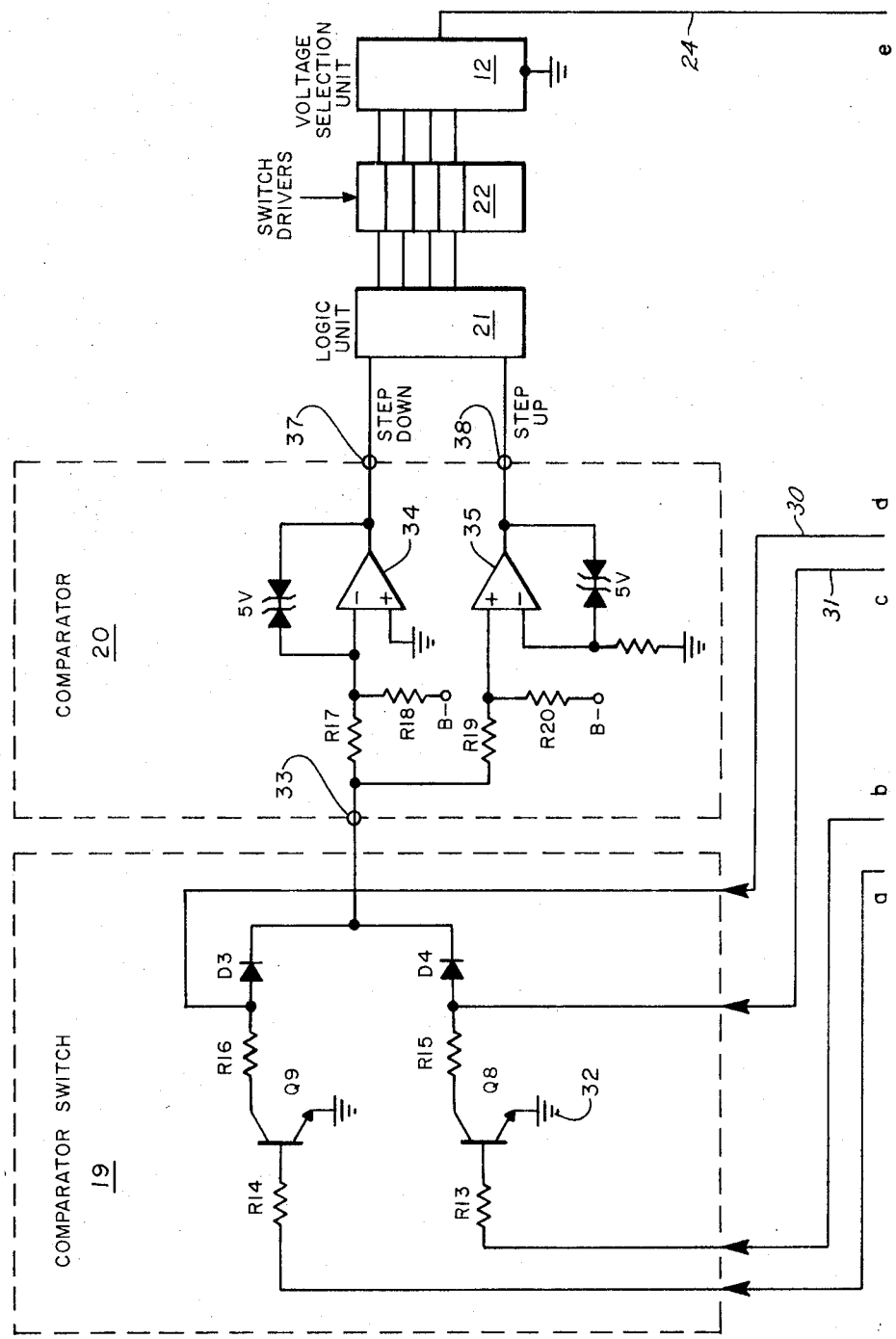

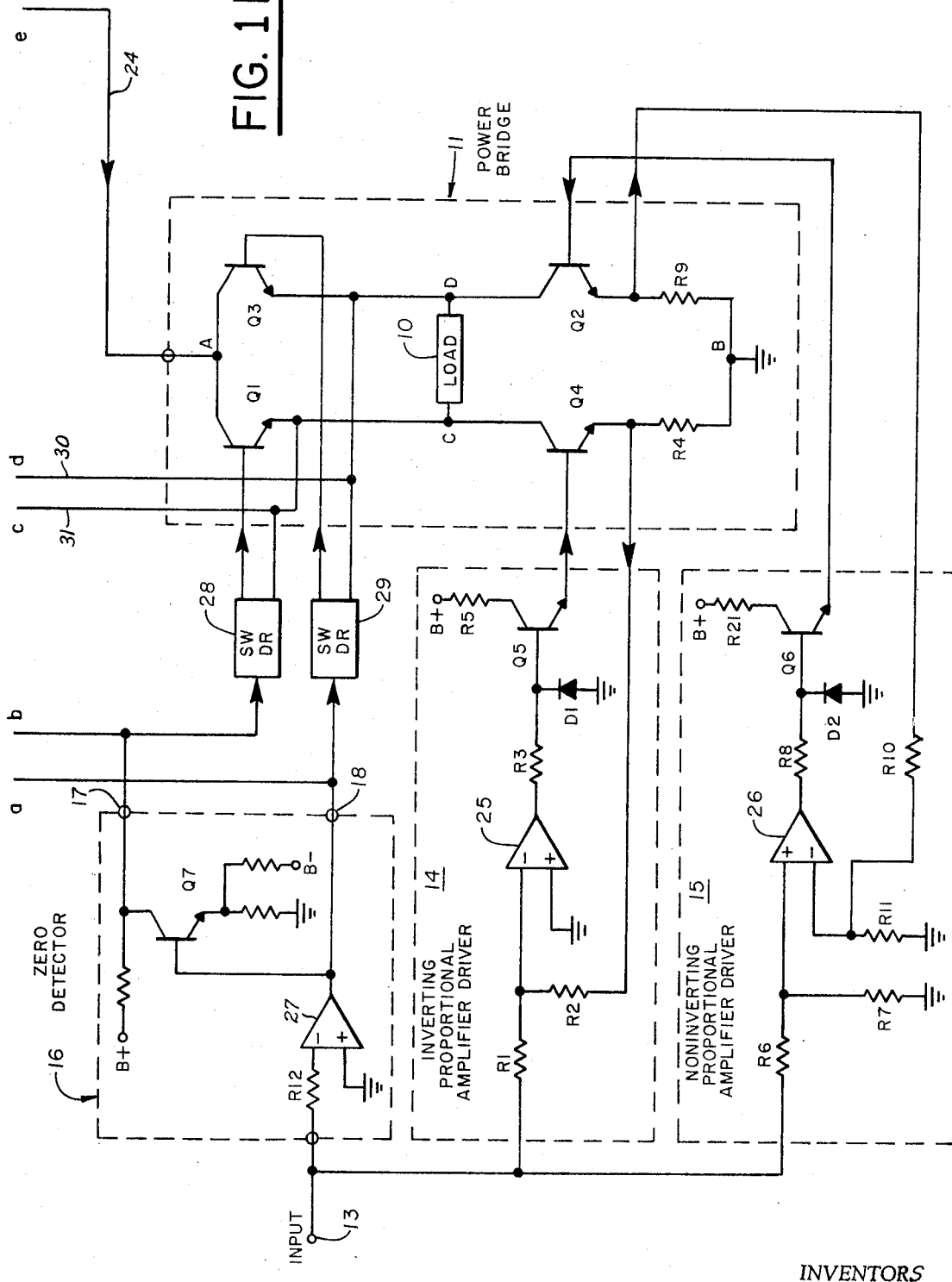

3,649,906

PROGRAMMABLE DC POWER SUPPLY

BACKGROUND OF THE INVENTION

1. Field of the Invention

The present invention relates to power supplies and more particularly to a programmable DC supply for providing controlled direct current to a variable-load circuit.

2. Description of the Prior Art

In certain applications, for instance, degaussing large objects such as ships or other craft, a variable direct current source must be provided which is capable of supplying to a variable load a comparatively large current extending over a wide range of values with high dynamic accuracy. One way to accomplish this, of course, is to provide a constant high level voltage that is capable of supplying any current up to the desired maximum. However, when it is desired to control the current level over a range of values which the load may assume during normal operation, this approach is not completely satisfactory for the reason that intolerable power dissipation will occur in the control device under conditions of low load impedance or high current flow. This problem can be circumvented by using parallel connected control devices but only with an attendant increase in cost, size and weight and a concomitant reduction of efficiency and reliability. A further disadvantage of simply supplying a constant high level voltage is that the current cannot be controlled over large ratios of values, say 100 to 1.

Another method of control is to switch pulses of current for variable time intervals to vary the output current. This requires a switching rate fast enough to accommodate the dynamics of the supply and filtering to remove the undesired alternating current components of the pulses. In order to provide high dynamic performance from a 60 Hz. power source it is necessary to rectify, filter, switch and filter again. The bulk and complexity of such a system make it undesirable.

SUMMARY OF THE INVENTION

The aforementioned disadvantages and limitations are overcome with the present invention by the provision of means for detecting high and low voltage thresholds across the control device and then selecting a higher or lower voltage for application to the load. More specifically, a monopolar embodiment of the invention utilizes a proportionally controlled transistor connected in series with the load. An input signal for controlling the level of the unidirectional DC load current is applied to the base of the transistor to vary the collector to emitter impedance thereof accordingly. For a condition where the load impedance is increasing and/or the control signal is calling for more current, the voltage drop across the load increases with an accompanying decrease of the voltage across the control transistor. Ultimately this would result in saturation of the transistor and then the input signal would no longer control the load current. At a level slightly above the transistor saturation voltage, however, a higher voltage is selected for application to the series combination of the load and transistor thereby assuring continuous operation of the transistor in its proportional range. Likewise, if the load impedance is decreasing and/or the control signal is calling for less current, the voltage across the load will decrease while the drop across the transistor simultaneously increases. Again, at a predetermined level a different voltage is selected for application to the load and transistor, except that in this instance the voltage is decreased from the previous value, thus assuring that the voltage across the transistor does not become excessive.

In another embodiment of the invention, wherein a capability is established for reversing the direction of current flow through the load in accordance with the polarity of the control signal, the load is coupled between the output terminals of a bridge circuit comprising a pair of proportionally controlled transistors and a pair of switching transistors. The current magnitude is controlled as in the aforedescribed embodiment and its direction is determined in accordance with the particular set of proportional and switching transistors which are activated in response to each polarity of the control signal.

BRIEF DESCRIPTION OF THE DRAWINGS

FIGS. 1a and 1b present a schematic illustration of a bipolar variable DC supply embodying the principles of the present invention.

DESCRIPTION OF THE PREFERRED EMBODIMENTS

Figure 2:
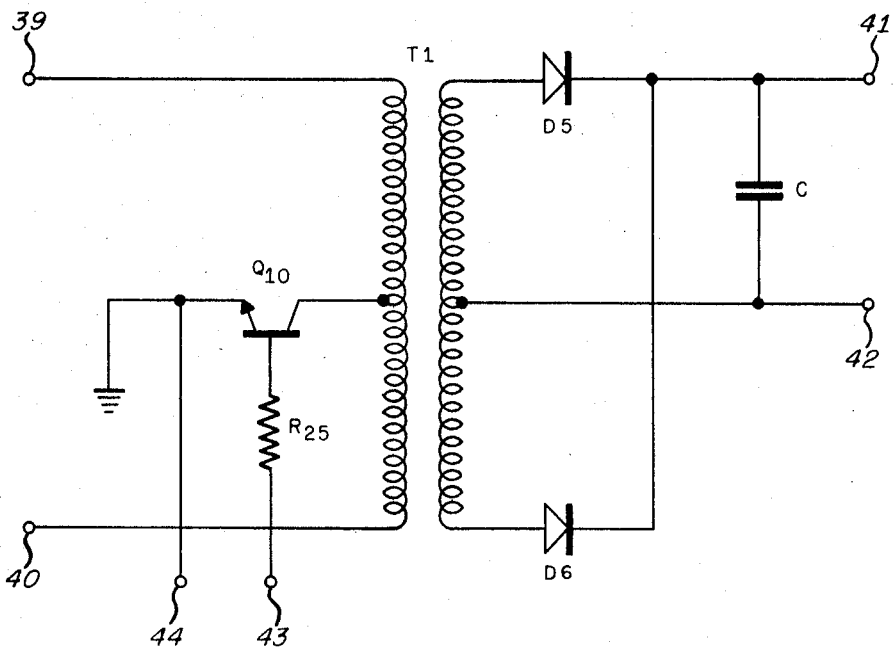
FIG. 2 is a schematic of the switch driver utilized in the apparatus of FIG. 1.

Referring to FIGS. 1a and 1b, a load 10 is connected across the output terminals C, D of power bridge 11. Voltage is applied to the bridge input terminals A, B from the voltage selection network 12. The power bridge comprises switching transistors $Q_1$ and $Q_3$ and proportionally controlled transistors $Q_2$ and $Q_4$. An input control signal is applied to the power supply at input terminal 13 which connects through inverting proportional amplifier driver 14 and noninverting proportional amplifier driver 15 to transistors $Q_4$ and $Q_2$, respectively, to control the level of current supplied to the load. The input terminal also connects through zero detector 16 to the switching transistors $Q_1$ and $Q_3$ which function in cooperation with transistors $Q_2$ and $Q_4$ to determine the direction of current flow through the load. The zero detector output terminals 17 and 18 also connect to comparator switch 19 which operates in conjunction with comparator 20, in response to the voltages at the collectors of proportional transistors $Q_2$ and $Q_4$, to provide respective step-up and stepdown signals at predetermined collector voltage levels. The step-up and stepdown signals in turn operate through logic unit 21 and switch drivers 22 to select a new voltage level from voltage selection network 12 for application to the power bridge input terminals A, B.

The general operation of the supply is such that transistor switch $Q_1$ is driven to the ON state, that is saturated, with $Q_2$ operating in its proportional control range while transistors $Q_3$ and $Q_4$ are in the OFF or nonconducting state for current flow through the load in the direction from bridge terminal C to terminal D. For reverse current flow in the direction from terminal D to terminal C, transistor $Q_3$ is driven into saturation while transistor $Q_4$ operates in the proportional control range and simultaneously transistors $Q_1$ and $Q_2$ are switched to the OFF state.

Voltage selection network 12 provides a plurality of discrete voltages at given increments, for example every 17.5 volts or 17.5, 35, 52.5, 70, etc. For a zero-volt signal applied to input control terminal 13 the voltage selection network provides the lowest voltage increment, 17.5 volts, for application to the power bridge by way of lead 24. As the input control signal increases either positively or negatively, the impedance of the operative proportional transistor decreases calling for more current to be supplied to the load and thereby reducing the voltage at the collector of the active proportional transistor. At a predetermined lower limit slightly above the saturation voltage of the proportional transistor, the voltage thereacross becomes operative through comparator switch 19 and comparator 20 to select the next higher voltage, 35 volts, for application to the power bridge whereby the required current is readily supplied to the load with sufficient voltage at the collector of the proportional transistor to assure that it functions in its proportional range and the input signal retains control of the load current. Operation continues in this manner with the voltage selection network providing successively higher voltages as the input signal increases to larger positive or negative values. For example, assume that 52.5 volts is applied to a 26-ohm load with a requirement for 2 amperes of current. At the 2-ampere level the voltage drop across the load would be 52 volts leaving only 0.5 volts at the collector of the active proportional control transistor, a level below the proportional control range. To preclude this condition the voltage applied to the bridge is increased before the proportionally controlled transistor voltage reaches the saturation level. Thus, the following action occurs as the input signal increases calling for the load current to increase; at a load current magnitude corresponding to a value of approximately 2 volts at the collector of the proportionally controlled transistor, the voltage selection network is actuated to apply the next higher voltage, 70 volts, to the power bridge. Under this condition, with 2 amperes supplied, 52 volts will be dropped across the load and the remaining 18 volts applied to the proportionally controlled transistor. In a similar manner, when the input voltage decreases to smaller positive or negative values, the bridge voltage is reduced to successively lower values each time the voltage at the collector of the proportional transistor reaches an upper predetermined limit. Concurrent with the foregoing operation, the inverting and noninverting proportional transistor drivers 14 and 15 cooperate with zero detector 16 to appropriately actuate transistors $Q_1$, $Q_2$, $Q_3$ and $Q_4$ so as to control the direction of current flow through the load in accordance with the polarity of the input signal.

Proceeding now to a more detailed discussion of the various sub-circuits, the inverting proportional amplifier driver 14 comprises an operational amplifier 25 which has its output coupled through resistor $R_3$ to the base of transistor $Q_5$ connected in a Darlington configuration with transistor $Q_4$. The input control signal applied to input terminal 13 couples through resistor $R_1$ to the inverting input terminal of amplifier 25. A negative feedback signal obtained from the voltage produced across resistor $R_4$, connected between the emitter of transistor $Q_4$ and terminal B of the power bridge, is also applied to the inverting input terminal of amplifier 25 by way of resistor $R_2$. The noninverting proportional amplifier driver 15 is essentially the same as the inverting proportional amplifier driver. It comprises an operational amplifier 26 which has its output coupled through a resistor $R_8$ to the base of transistor $Q_6$ connected in a Darlington circuit with transistor $Q_2$. The input control signal couples through a divider network made up of resistors $R_6$ and $R_7$ to the noninverting input terminal of amplifier 26. A negative feedback signal derived from resistor $R_9$, connected between the emitter of transistor $Q_2$ and terminal B of the power bridge, is applied to the inverting input terminal of amplifier 26 through the divider network consisting of resistors $R_{10}$ and $R_{11}$. Diodes $D_1$ and $D_2$, connected to the base terminals of transistors $Q_5$ and $Q_6$, respectively, limit the negative voltages applied thereto.

Zero detector 16 comprises an operational amplifier 27 which receives the input control signal through resistor $R_{12}$ connected to its inverting input terminal. The output of amplifier 27 connects directly to zero detector output terminal 18 and through an inverting amplifier comprising transistor $Q_7$ to zero detector output terminal 17 which in turn connects through switch driver 28 to transistor switch $Q_1$ and through resistor $R_{13}$ to transistor $Q_8$ in the comparator switch. Likewise, zero detector output terminal 18 connects through switch driver 29 to transistor switch $Q_3$ and through resistor $R_{14}$ to transistor $Q_9$ in the comparator switch.

In operation of the power supply, application of a positive signal to input terminal 13 produces a negative signal through inverting proportional amplifier driver 14 at the base of transistor $Q_4$ causing it to switch to the OFF or open state while simultaneously a positive signal is produced through noninverting proportional amplifier 15 at the base of transistor $Q_2$ so as to drive it in the proportional control range. The positive polarity signal produced across resistor $R_9$ provides negative feedback by virtue of being applied to the inverting input terminal of amplifier 26 and thus transistor $Q_2$ stabilizes at the point where the current through resistor $R_9$ provides sufficient voltage to balance out the positive input control signal at amplifier 26. At the same time, the positive input signal feeds through zero detector 16 to provide positive and negative signals respectively at zero detector output terminals 17 and 18. The positive signal at terminal 17 is applied through switch driver 28 to the base of transistor $Q_1$ driving it to the closed or saturated state. The negative signal at terminal 18 is applied through switch driver 29 to the base of transistor $Q_3$ driving it to the OFF state. It is therefore seen that a positive input control signal causes current to flow through the load in the direction from terminal C to terminal D of the power bridge as a consequence of transistors $Q_3$ and $Q_4$ being open while transistor $Q_1$ is closed and transistor $Q_2$ is proportionally controlled.

The voltage at the collector of the active proportionally controlled transistor $Q_2$ is applied to comparator switch 19 by way of lead 30 connected to the junction between diode $D_3$ and resistor $R_{16}$ connected to the collector of transistor $Q_9$. Likewise, the voltage at the collector of transistor $Q_4$ is applied by way of lead 31 to the junction of diode $D_4$ and resistor $R_{15}$ connected to the collector of transistor $Q_8$. The positive signal at zero detector output terminal 17 saturates transistor $Q_8$ causing the voltage at the collector of transistor $Q_4$ to be connected by way of resistor $R_{15}$ to ground 32. Transistor $Q_9$, however, remains in the open state as a result of the negative voltage applied to its base terminal from zero detector output terminal 18. Hence, the voltage across the active transistor $Q_2$ is applied through diode $D_3$ to the input terminal 33 of comparator 20 while simultaneously functioning to back bias diode $D_4$.

Comparator 20 comprises operational amplifiers 34 and 35. Amplifier 34 has its inverting input terminal connected through resistor $R_{17}$ to comparator input 33 and through resistor $R_{18}$ to the $B^-$ supply, the voltage division ratio of resistors $R_{17}$ and $R_{18}$ being selected so as to rapidly reverse the normally positive output of amplifier 34 to a negative value at the instant the voltage at the collector of active transistor $Q_2$ reaches an upper predetermined limit, say 22 volts. The only restriction in the choice of this upper limit is that it must be greater than the voltage increment (17.5 volts) provided by voltage selection network 12 but not so large as to permit excessive voltage to be applied to the proportional control transistor. Amplifier 35 has its noninverting input connected through resistor $R_{19}$ to comparator input terminal 33 and through resistor $R_{20}$ to the $B^-$ supply. The voltage division ratio of resistors $R_{19}$ and $R_{20}$ is selected to rapidly reverse the normally positive output of amplifier 35 to a negative value at the instant the collector voltage of transistor $Q_2$ diminishes to a predetermined lower limit slightly above its saturation voltage, say two times its saturation voltage plus the voltage across feedback resistor $R_9$, or approximately 2 volts.

Logic unit 21 responds to the respective step-up and step-down commands provided at the comparator output terminals 36 and 37 to provide signals to the appropriate switch drivers 22 and thereby actuate the voltage selection network. The logic unit can be constructed from conventional circuits, for example, an up-down counter inhibited from stepping below zero or above the highest count corresponding to the number of discrete voltages obtainable from the voltage selection network. In the case of 16 discrete voltages, for instance, from 17.5 volts to 280 volts in increments of 17.5 volts, a zero count can represent selection of 17.5 volts, a one count selection of 35 volts and so on up to a count of 15 representing selection of 280 volts. The inhibit features preclude the voltage from changing abruptly from 17.5 to 280 or conversely.

In the case of a negative signal applied to input terminal 13, the operation is essentially the same except that in this instance transistors $Q_3$ and $Q_4$ become operative to direct current through the load in the direction opposite to that resulting from a positive input signal.

A schematic of the switch drivers used in the apparatus of FIG. 1 is shown in FIG. 2. Each switch driver comprises a transistor $Q_{10}$ which has its collector connected to the center tap of the primary winding of a transformer $T_1$. A 5 kHz. square wave derived from the output of a multivibrator (not shown) is applied across the primary winding by connection to terminals 39 and 40. The transformer secondary winding is coupled through diodes $D_5$ and $D_6$ to output terminal 41 while the center tap of the secondary is connected to output terminal 42, a filter capacitor C being typically connected across the output terminals. When used in the apparatus of FIG. 1, for example, as switch driver 28, output terminals 41 and 42 are connected respectively to the base and emitter of transistor $Q_1$ and the zero detector output terminal 17 couples to switch driver terminal 43 which in turn connects through resistor $R_{25}$ to the base of transistor $Q_{10}$. The other driver terminal 44 couples to the emitter of transistor $Q_{10}$ and is typically grounded. In operation of the switch driver, application of a drive signal across driver terminals 43 and 44 sufficient to saturate transistor $Q_{10}$ provides for power transfer of the square wave signal at terminals 39 and 40 to output terminals 41 and 42 with isolation provided between the driver and output signals so that no interference occurs between signal ground and the power ground of the equipment being controlled.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. A power source for supplying bipolar variable DC current to a load in accordance with the polarity and magnitude of an input control signal applied to said source comprising
   a bridge circuit having input terminals (A) and (B) for receiving the voltage applied thereto and output terminals (C) and (D) adapted for connection to the load,
   said bridge circuit including first and second switching elements connected respectively between input terminal A and output terminals (C) and (D) and first and second proportionally controlled transistors connected respectively between input terminal (B) and output terminals (C) and (D),
   means for applying the input control signal to the switching elements of said bridge in a manner to close one of said switching elements and open the other switching element for one polarity and conversely for the other polarity of the control signal,
   means for applying the input control signal to the proportionally controlled transistors of said bridge in a manner to open circuit the one in series with the closed switching element and regulate the impedance of the other in accordance with the magnitude of the control signal,
   means responsive to the voltage across the active proportionally controlled transistor for providing a step-up signal at one level of the voltage thereacross and a stepdown signal at another level of voltage thereacross, and
   means responsive to the step-up and stepdown signals for incrementally changing the voltage applied to the input terminals of said bridge.

2. The apparatus of claim 1 wherein said means for applying the input control signal to the proportionally controlled transistors includes inverting and noninverting driver amplifiers
   said inverting driver amplifier having its input connected to receive the input control signal and its output connected to the base of one of said proportionally controlled transistors, and
   said noninverting driver amplifier having its input connected to receive the input control signal and its output connected to the base of the other of said proportionally controlled transistors.

3. The apparatus of claim 2 including
   first resistance means coupled to said one proportionally controlled transistor to provide a first feedback signal representative of the current flowing through said load when said one transistor is active,
   means coupling said first resistance means to said inverting driver amplifier for algebraically summing therein the input control and first feedback signals to provide a drive signal which controls said one proportionally controlled transistor to regulate the load current in accordance with the magnitude of the input control signal for one polarity thereof,
   second resistance means coupled to said other proportionally controlled transistor to provide a second feedback signal representative of the current flowing through said load when said other transistor is active, and
   means coupling said second resistance means to said noninverting driver amplifier for algebraically summing therein the input control and second feedback signals to provide another drive signal which controls said other proportionally controlled transistor to regulate the load current in accordance with the magnitude of the input control signal for the opposite polarity thereof.

4. The apparatus of claim 3 wherein said means for applying the input control signal to said bridge switching elements includes a zero detector comprising first and second signal inverting amplifier stages,
   the input of said first inverting amplifier stage being connected to receive the input control signal,
   the output of said first inverting amplifier stage being connected to drive the second switching element of said bridge, and
   the output of said second inverting amplifier stage being connected to drive the first switching element of said bridge.

5. The apparatus of claim 4 wherein said means responsive to the voltage across the active proportionally controlled transistor includes a comparator switch circuit comprising,
   a first switch serially connected with a resistor and a diode,
   a second switch serially connected with an additional resistor and an additional diode,
   said first switch being connected to be actuated by the signal at the output of the first inverting amplifier stage of said zero detector,
   said second switch being connected to be actuated by the signal at the output of the second inverting amplifier stage of said zero detector,
   the junction of said resistor and said diode being connected to output terminal (D) of said bridge circuit,
   the junction of said additional resistor and said additional diode being connected to output terminal (C) of said bridge circuit, and
   the side of said diodes opposite said junctions being coupled together at the output of said comparator switch.

6. The apparatus of claim 5 wherein said means responsive to the voltage across the active proportionally controlled transistor further includes a comparator comprising first and second threshold detectors each having its input connected to the output of said comparator switch, said first and second threshold detectors being operative to provide said step-up and stepdown signals respectively.

7. The apparatus of claim 6 wherein the first and second switching elements of said bridge are respective transistors.

8. The apparatus of claim 3 wherein said first resistance means is serially connected from said one proportionally controlled transistor to terminal B of the bridge circuit and said second resistance means is serially connected from said other proportionally controlled transistor to terminal B of the bridge circuit.

9. The apparatus of claim 3 wherein said means for applying the input control signal to said bridge switching elements comprises a zero detector including at least one signal inverting amplifier stage connected to receive the input control signal,
   said zero detector providing an output signal of opposite polarity to the input control signal for application to the one bridge switching element in series with the active proportionally controlled transistor to open said one switching element and another output signal of the same polarity as the input control signal for application to the other bridge switching element to close said other switching element and thereby enable current to flow through the load in one direction or the other in accordance with the polarity of the input control signal.

10. The apparatus of claim 9 wherein said means responsive to the voltage across the active proportionally controlled transistor includes a comparator switch circuit comprising a first switch serially connected with a resistor and a diode,
a second switch serially connected with an additional resistor and an additional diode,
    said first switch being connected to be actuated by one of the output signals provided at the output of the zero detector,
    said second switch being connected to be actuated by the other of the output signals provided at the output of the zero detector,
the junction of said resistor and said diode being connected to one of the output terminals of the bridge circuit and the junction of said additional resistor and said additional diode being connected to the other output terminal of the bridge circuit such that the active proportionally controlled transistor is disassociated with that switch of said first and second switches of the comparator switch circuit which is concurrently actuated by an output signal from the zero detector, and
the side of said diodes opposite said junctions being coupled together at the output of said comparator switch.

11. The apparatus of claim 10 wherein said means responsive to the voltage across the active proportionally controlled transistor further includes a comparator comprising first and second threshold detectors each having its input connected to the output of said comparator switch, said first threshold detector normally providing a step-up signal of predetermined polarity until the signal at the comparator switch output decreases to a predetermined level whereupon the step-up signal reverses polarity and changes the voltage applied to the input terminals of the bridge to the next higher increment, and said second threshold detector normally providing a step-down signal of predetermined polarity until the signal at the comparator switch output increases to a predetermined level whereupon the stepdown signal reverses polarity and changes the voltage applied to the input terminals of the bridge to the next lower increment.

12. The apparatus of claim 11 wherein the predetermined level of the first threshold detector is slightly greater than the saturation voltage of the active proportionally controlled transistor and the predetermined level of the second threshold detector is greater than the difference between adjacent incremental voltage levels applied to the bridge circuit.

* * * * *